United States Patent
Aschauer et al.

(10) Patent No.: US 11,784,790 B2
(45) Date of Patent: Oct. 10, 2023

(54) METHOD FOR OPERATING KEYSTREAM GENERATORS FOR SECURE DATA TRANSMISSION, THE KEYSTREAM GENERATORS BEING OPERATED IN COUNTER MODE, KEYSTREAM GENERATOR HAVING COUNTER MODE OPERATION FOR SECURE DATA TRANSMISSION, AND COMPUTER PROGRAM PRODUCT FOR KEYSTREAM GENERATION

(71) Applicant: Siemens Aktiengesellschaft, München (DK)

(72) Inventors: Hans Aschauer, Munich (DE); Gökçe Aydos, Berlin (DE); Markus Heintel, Munich (DE); Johannes Zwanzger, Neubiberg (DE)

(73) Assignee: SIEMENS AKTIENGESELLSCHAFT

(*) Notice: Subject to any disclaimer, the term of this patent is extended or adjusted under 35 U.S.C. 154(b) by 229 days.

(21) Appl. No.: 17/429,678

(22) PCT Filed: Jan. 13, 2020

(86) PCT No.: PCT/EP2020/050697
§ 371 (c)(1),
(2) Date: Aug. 10, 2021

(87) PCT Pub. No.: WO2020/164828
PCT Pub. Date: Aug. 20, 2020

(65) Prior Publication Data
US 2022/0158822 A1 May 19, 2022

(30) Foreign Application Priority Data
Feb. 15, 2019 (EP) .................................. 19157373

(51) Int. Cl.
H04L 29/06 (2006.01)
H04L 9/06 (2006.01)
(52) U.S. Cl.
CPC .................................. *H04L 9/0637* (2013.01)
(58) Field of Classification Search
None
See application file for complete search history.

(56) References Cited

U.S. PATENT DOCUMENTS

2013/0010954 A1* 1/2013 Falk .................... H04L 63/0442
380/255
2014/0270163 A1* 9/2014 Merchan ............... H04L 9/0869
380/46
2018/0375842 A1 12/2018 Aschauer et al.

FOREIGN PATENT DOCUMENTS

DE 10223217 A1 * 12/2003 ......... H04L 63/0457
DE 10223217 A1 12/2003
(Continued)

OTHER PUBLICATIONS

PCT International Search Report dated Mar. 30, 2020 corresponding to PCT International Application No. PCT/EP2020/050697 filed Jan. 13, 2020.

*Primary Examiner* — Andrew J Steinle
(74) *Attorney, Agent, or Firm* — Schmeiser, Olsen & Watts LLP

(57) ABSTRACT

Keystream generators for secure data transmission, the keystream generators being operated in counter mode, against repeated or improper generation of an already generated keystream and to protect the data transmission against repeated use of a keystream, so-called reuse are provided. The keystream generator is operated, with respect to realization options, selectively in one of two operating modes, an encryption operating mode and a decryption operating mode. In the encryption operating mode, a keystream gen- (Continued)

erated on the basis of a first control data set is used to encrypt data, in particular payload data, to form cipher-data, the product of ciphered data or payload data. In the decryption operating mode, a keystream generated on the basis of a second control data set is used to decrypt the cipher-data. The keystream is output only if the generation of the keystream from the encryption of a counter value of the keystream generator operated in counter mode with a block cipher key is error-free.

16 Claims, 1 Drawing Sheet

(56) References Cited

FOREIGN PATENT DOCUMENTS

| | | | | |
|---|---|---|---|---|
| EP | 3422657 A1 * | 1/2019 | ......... | H04L 63/0227 |
| EP | 3422657 A1 | 1/2019 | | |

* cited by examiner

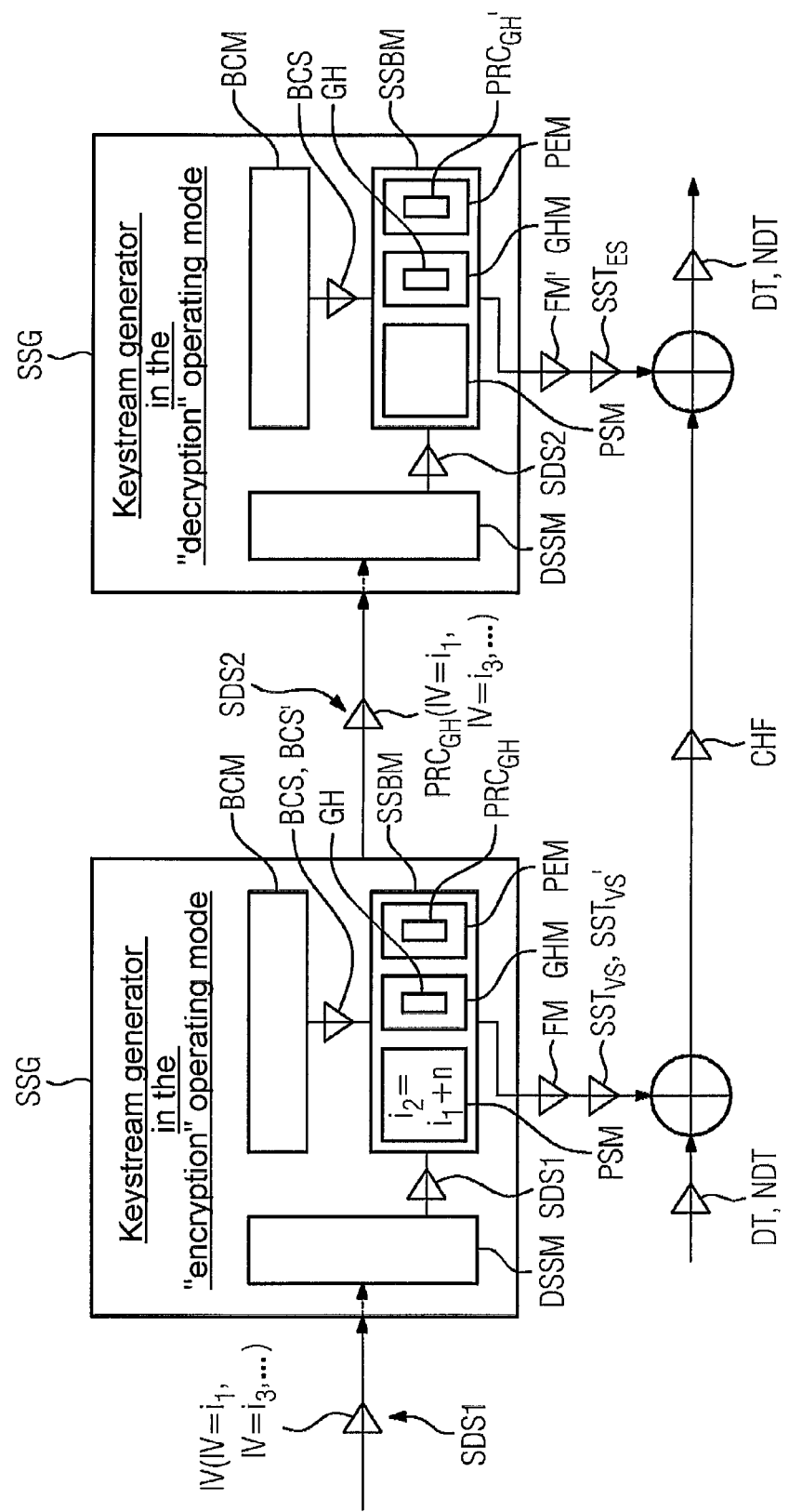

METHOD FOR OPERATING KEYSTREAM GENERATORS FOR SECURE DATA TRANSMISSION, THE KEYSTREAM GENERATORS BEING OPERATED IN COUNTER MODE, KEYSTREAM GENERATOR HAVING COUNTER MODE OPERATION FOR SECURE DATA TRANSMISSION, AND COMPUTER PROGRAM PRODUCT FOR KEYSTREAM GENERATION

CROSS-REFERENCE TO RELATED APPLICATIONS

This application claims priority to PCT Application No. PCT/EP2020/050697, having a filing date of Jan. 13, 2020, which is based on EP Application No. 19157373.2, having a filing date of Feb. 15, 2019, the entire contents both of which are hereby incorporated by reference.

FIELD OF TECHNOLOGY

The following relates to a method for operating keystream generators for secure data transmission, the keystream generators being operated in counter mode, a keystream generator having counter mode operation for secure data transmission, and a computer program product for keystream generation.

BACKGROUND

EP 3 422 657 A1 discloses a system and method for the division and synchronization of crypto functionality, e.g. encryption, cryptographic integrity protection, with the requisite protocol adaptations for this within a modularly constructed device for the cryptographic processing of network traffic. The aim of the division is to restrict the information exchange to the absolute minimum necessary. No component should obtain access to data which are not required for accomplishing the component-specific task. This reduces the required trust in the individual components, e.g. as a result of non-trustworthy, in particular manipulative components. This modularization can be used for distributing the tasks between a basic control device and a security module.

In that case, the cryptographic processing itself is subdivided further. In accordance with this subdivision, a first cryptographic processing unit on the security module is intended to provide a keystream and a second cryptographic processing unit is intended to combine payload data with the keystream. The parameterization, e.g. choice of key and initialization vector, of the first cryptographic processing unit is effected in a tag-controlled manner with the aid of a tag.

In that case, it may additionally be expedient likewise to subdivide a controller functionality on the basic control device. A first controller performs the classification of the payload data, while a second controller carries out the cryptographic processing and the post-processing. In this variant, the first cryptographic processing unit only sees the tag and has no access to the payload data. That affords advantages with regard to trustworthiness and it reduces the bandwidth of the interface between the basic control device and the security module since the payload data do not have to be transferred to the security module.

The keystream is generated using a keystream generator which is based on a symmetrical block cipher and is operated in the so-called counter mode. In that case, a continuous counter is encrypted using the block cipher. The result is the pseudo-random keystream dependent on the block cipher key used. The keystream is subsequently combined with the payload data to give rise to a ciphertext. In order that the generated keystream can be used securely, it is essential that each counter value is only used exactly once to generate a keystream for the encryption of payload data.

In the counter mode, the initial value of the counter is normally predefined as an initialization vector. In the case of the system and method for division and synchronization of cryptofunctionality as described in EP 3 422 657 A1, one possible attack consists in multiple transfer of the initialization vector or the initialization vector being chosen such that double use of the counter occurs during operation.

Such an attack is not expected in different systems than the system known from EP 3 422 657 A1, since in the different systems, in contrast to the system known from EP 3 422 657 A1, where the encryption logic is subdivided into a plurality of (two) trust zones, the complete encryption logic takes place in a single, non-subdivided trust zone.

SUMMARY

An aspect relates to a method for operating keystream generators for secure data transmission, the keystream generators being operated in counter mode, a keystream generator having counter mode operation for secure data transmission, and a computer program product for keystream generation in which the keystream generator is protected against repeated or improper generation of an already generated keystream and the data transmission is protected against repeated use of a keystream, so-called reuse.

In an embodiment, this object is achieved by the method features specified in the characterizing part.

Furthermore, In an embodiment, this object is achieved by the server features specified in the characterizing part.

Moreover, in an embodiment, this object is achieved by the reference to method features, the reference being given in the characterizing part.

The concept underlying embodiments of the invention in accordance with the technical teaching consists, for the purpose of secure data transmission, in operating a keystream generator in counter mode and, with respect to realization options, optionally in one of two operating modes, an "encryption" operating mode and a "decryption" operating mode, wherein in the "encryption" operating mode a keystream generated on the basis of a first control data set is used for encrypting data, in particular payload data, to form a ciphertext, the product of ciphered data or payload data, and wherein in the "decryption" operating mode a keystream generated on the basis of a second control data set is used for decrypting the ciphertext, wherein the keystream is output only if the generation of the keystream from the encryption of a counter value of the keystream generator operated in counter mode using a block cipher key is error-free.

Within the meaning of embodiments of the present invention/application, the term "encryption" in the "encryption" operating mode is understood to mean the encryption and/or authentication of data or payload data, wherein accordingly in the "encryption" operating mode a keystream is generated for the encryption and/or authentication of data or payload data.

Within the meaning of embodiments of the present invention/application, the term "decryption" in the "decryption" operating mode is understood to mean the decryption, authentication and/or verification of data or payload data, wherein accordingly in the "decryption" operating mode a keystream is generated for the decryption, authentication and/or verification of data or payload data.

The formation of the keystream is effected in such a way that the keystream is formed from the encryption of a counter value using a block cipher key, the counter value being determined continuously in the form of control-data-set-related calling of the keystream generator, initially being given by an initialization vector contained in the control data set, wherein $IV=i_1$, and lying in a delimited counter value range, e.g., of the order of magnitude of greater than $2^{32}$.

The fact that generally it is not efficient to retain all already used counter readings of a counter in the keystream generator, since the value range of the counter is typically of the order of magnitude of greater than or equal to $2^{32}$, was the starting point for considerations in the direction of the concept underlying embodiments of the invention.

In this scenario according to embodiments of the invention for secure data communication and for error-free generation of the keystream, in the "encryption" operating mode of the keystream generator the sequential use of the counter values is logged and the logging allows recognition of whether the block cipher key has been used erroneously with the same counter value. In this case, used erroneously can mean that the block cipher key has been used multiply or sequentially multiply, i.e. a number of times in succession, with the same counter value. In an embodiment, the logging takes place in a log memory module of a keystream forming module of the keystream generator and the recognition on account of the logging of whether the block cipher key has been used erroneously with the same counter value takes place in a check recognition module of the keystream forming module in the keystream generator.

If this recognition in the check recognition module, on the basis of the logged counter values, reveals that an erroneous use has occurred, then afterward an error message or no keystream is output by the keystream generator.

By contrast, if an error-free use has taken place, then the keystream for the encryption of the data is output by the keystream generator.

Furthermore, in the case of error-free use, for a validity check in the "decryption" operating mode a check code is generated, which, for the "encryption" operating mode, is linked to a secret. In an embodiment, the secret is either generated in a secret module of the keystream forming module or is introduced into the keystream generator from outside and then stored in the secret module. The secret is required in order to generate (in the "encryption" operating mode) and to validate (in the "decryption" operating mode) the check code. In this regard, the secret can be generated from the block cipher key e.g. by way of a derivation function. In the simplest case, however, the secret is chosen to be identical to the block cipher key.

In an embodiment, since the secret has to be identical in both secret modules (for the "encryption" operating mode/ for the "decryption" operating mode) for some embodiments, e.g. in the case of a symmetrical "message authentication code <MAC>", it is introduced from outside.

In the "decryption" operating mode of the keystream generator, in the scenario for secure data communication and for error-free generation of the keystream, the erroneous, in particular the multiple or sequentially multiple, use of the block cipher key and counter values is recognized on the basis of the generated check code as the second control data set in the course of a validity check of the check code carried out on the basis of the secret, and whether the block cipher key has been used erroneously with the same counter value.

In this case, used erroneously can once again mean that the block cipher key has been used multiply or sequentially multiply, i.e. a number of times in succession, with the same counter value. In an embodiment, the validity check also takes place in the check recognition module of the keystream forming module in the keystream generator. The fact of whether the generated check code representing the second control data set is valid is recognized in the course of the validity check.

If this check code validity check in the check recognition module leads to a negative result, which means that the check code representing the second control data set is incorrect, then afterward a further error message or no keystream is output by the keystream generator.

However, if the result of the check code validity check in the comparison recognition module is positive, this means that the check code representing the second control data set is correct, and afterward the keystream for decrypting the ciphertext is output by the keystream generator.

In this case, in an embodiment the validity of the check code is checked in such a way that in the "decryption" operating mode, on the basis of the secret, a further check code is generated and the further check code is compared with the check code generated in the "encryption" operating mode in regard to correspondence.

In an embodiment, the check code is used to protect the initialization-vector-based counter value, and the check code for authenticating the initialization vector is an asymmetrical signature or a symmetrical "message authentication code <MAC>".

In order to increase security, in particular visa vis replay attacks, besides the initialization vector further auxiliary data, e.g. generation counters and/or a nonce, a digital fingerprint from the block cipher key, can influence the check code or the "message authentication code <MAC>" or the asymmetrical signature.

In an embodiment, it is possible for the initialization vector in the "decryption" operating mode not only to be predefined from outside, but also to be automatically chosen or predefined by the keystream generator.

In the "decryption" operating mode, the initialization vector is made available together with the check code or the "message authentication code <MAC>" or the asymmetrical signature.

In the "encryption" operating mode, it is stipulated that the counter in the keystream generator increases strictly monotonically. That is to say: if upon the first calling of the keystream generator the initialization vector where $IV=i_1$ is transferred as first control data set and the keystream generation uses up "n" counter values, then upon the next calling the initialization vector where $IV=i_3$ where $i_3 \geq i_2 = i_1 + n$ must be chosen or input (transferred). For checking purposes, only the next usable counter reading $i_2 = i_1 + n$ must be stored in the keystream generator. The transferred initialization vector where $IV=i_3$ is then compared in each case with the stored counter reading and either a keystream or an error message is output depending on the comparison. After the block cipher key has been updated, the value i is reset to zero. This is required if it is necessary to preclude the (non-sequential) multiple use of the block cipher key outside the procedure described.

In the "decryption" operating mode it cannot be assumed that the counter of the keystream generator always increases monotonically during regular operation. In this regard, during exchange of encrypted data via a network, for example, it may happen that various data network packets are not delivered in their original order. It ought nevertheless to be ensured that in the "decryption" operating mode the keystream generator does not accept arbitrary initialization vectors chosen by the attacker. To that end, the state of the initialization vector used, the state being protected by the check code or the "message authentication code <MAC>" or the asymmetrical signature, is transferred as second control data set by the key stream generator in the "encryption" operating mode. The keystream generator in the "decryption" operating mode only accepts initialization vectors if the check code or the "message authentication code <MAC>" or the asymmetrical signature is correct.

If an erroneous, e.g. double or multiple, use of the initialization vector is ascertained, the keystream generator reacts to the error in a suitable manner. In embodiments, the following error reactions are conceivable:

Indication/setting of an error state, e.g., error bit as output.
Prevention of the outputting of a keystream, in particular in the "decryption" operating mode.
Outputting of an invalid keystream, in particular in the "encryption" operating mode. In order to generate the invalid keystream, a randomly chosen block cipher key or a block cipher key derived from the block cipher key by an arbitrary function can be chosen.

The choice of the operating mode can advantageously be effected as follows:

Dynamic, explicit choice: the keystream generator can be dynamically configured from outside, thus e.g. by a configuration PIN or a configuration command.
Static choice: the hardware of the keystream generator is defined in regard to one of the two operating modes. This can be done directly in production or subsequently, e.g. by setting a fuse.
Automatic choice: this is done by the first control data set, i.e. the data set that is input contains no additional information, or "message authentication code <MAC>" information, whereby the "encryption" operating mode is selected.
Automatic choice: this is done by the second control data set, i.e. the data set that is input contains additional information, or "message authentication code <MAC>" information, whereby the "decryption" operating mode is selected.

The keystream generator can furthermore be designed such that it is no longer possible to change the operating mode after the initial choice for a context, e.g. availability/use of an existing or specific block cipher key for the entire lifetime of the keystream generator.

In an embodiment, the keystream generation can additionally be effected in a computer program product (for example, non-transitory computer readable storage medium having instructions, which when executed by a processor, perform actions) comprising a nonvolatile, readable memory, in which processor-readable control program instructions of a program module that carries out the keystream generation are stored, and a processor connected to the memory, the processor executing the control program instructions of the program module for keystream generation, wherein the computer program product for this purpose implements the technical measures set out and explained above, but in particular carries out the disclosed method.

BRIEF DESCRIPTION

Some of the embodiments will be described in detail, with references to the following FIGURES, wherein like designations denote like members, wherein:

FIG. 1 shows a keystream generator arrangement with a keystream generator in an "encryption" operating mode and a keystream generator in a "decryption" operating mode.

DETAILED DESCRIPTION

FIG. 1 shows a keystream generator arrangement having for secure data transmission a keystream generator SSG operated in counter mode in an "encryption" operating mode and a keystream generator SSG operated in counter mode in a "decryption" operating mode. For the secure data transmission, data DT to be transmitted, which are present e.g. in the form of payload data NDT, are firstly encrypted to form a ciphertext CHF for encryption purposes using a generated keystream $SST_{VS}$ and subsequently the data DT, NDT in the ciphertext CHF are decrypted for decryption purposes using a generated keystream $SST_{ES}$.

The two keystream generators SSG are constructed identically as far as the keystream generator infrastructure is concerned. In this regard, each keystream generator SSG operated in counter mode in the keystream generator arrangement illustrated contains a data set interface module DSSM, a block cipher module BCM and a keystream forming module SSBM, which are connected to one another and form a common functional unit in each case optionally either for the generation of the keystream $SST_{VS}$ for data encryption or for the generation of the keystream $SST_{ES}$ for data decryption. The keystream $SST_{VS}$ is generated in the keystream generator SSG in the "encryption" operating mode on the basis of a first control data set SDS1, which is fed to the keystream forming module SSBM via the data set interface module DSSM. The keystream $SST_{ES}$, by contrast, is generated in the keystream generator SSG in the "decryption" operating mode on the basis of a second control data set SDS2, which is also fed to the keystream forming module SSBM via the data set interface module DSSM (cf. explanations concerning the keystream generator SSG in the "decryption" operating mode further below).

Furthermore, a block cipher key BCS is also fed to the keystream forming module SSBM from the block cipher module BCM. On the basis of the fed-in control data set SDS1, SDS2 and the block cipher key BCS, the keystream $SST_{VS}$, $SST_{ES}$ is formed in the embodied functional unit described above. This keystream formation is effected from the encryption of a counter value using a block cipher key BCS, the counter value being determined continuously in the form of control-data-set-related calling $i_1$, $i_3$, ... of the keystream generator SSG, initially being given by an initialization vector IV contained in the control data set SDS1, SDS2, wherein IV=$i_1$, and lying in a delimited counter value range.

With respect to the keystream forming module SSBM, the formed functional unit described above furthermore also extends to a log memory module PSM, a secret module GHM and a check recognition module PEM, which, in the context of the functional unit formed by the keystream forming module SSBM, are all contained in the keystream forming module SSBM and interact functionally with one another. In an embodiment, the keystream forming module SSBM with the stated modules contained therein, from the type of functional interaction of the modules and the constitution, is embodied as a computer program product for keystream generation comprising a nonvolatile, readable memory, in which processor-readable control program instructions of a program module that carries out the keystream generation are stored, and a processor connected to the memory, the processor executing the control program instructions of the program module for keystream generation.

In the case of the keystream generator arrangement illustrated, in the keystream generator SSG that is in the "encryption" operating mode, upon the first calling $i_1$ of the keystream generator SSG operated in counter mode, with which the keystream generator is in a first operating counting cycle $i_1$, an initialization vector IV where IV=$i_1$ is given as the first control data set SDS1. In this case, given can mean that the initialization vector IV either is automatically predefined by the keystream generator SSG in the "encryption" operating mode or as—as is illustrated in FIG. 1—is fed to the keystream generator SSG from outside.

A keystream generation following that, wherein the keystream generator SSG is in a second operating counting cycle $i_2$ uses up "n" counter values from the counter value range up to a counter reading $i_2=i_1+n$. This counter reading $i_2=i_1+n$ is stored for logging purposes in the log memory module PSM.

Upon the subsequent second calling $i_3$ of the keystream generator SSG operated in counter mode, with which the keystream generator is in a second operating counting cycle $i_3$, there are now the two options again. Either the keystream generator SSG choses a further initialization vector IV where $i_3 \geq i_2 = i_1+n$ as further first control data set SDS1 or, as an alternative to the choice, once again a further initialization vector IV where IV=$i_3$ is input as further first control data set SDS1 from outside and the further initialization vector IV that is input upon the second calling $i_3$ is compared with the stored counter reading with regard to an initialization vector-counter reading condition $i_3 \geq i_2 = i_1+n$ to be met. This comparison takes place in the check recognition module PEM of the keystream forming module SSBM in the keystream generator SSG.

What is inherent to both options is that the sequential use of the counter values is logged and the logging allows recognition of whether the block cipher key BCS has been used erroneously, thus, e.g. multiply or sequentially multiply, with the same counter value. This recognition of the erroneous use in the "encryption" operating mode of the keystream generator SSG is effected by way of the corresponding functional interaction and the corresponding embodiment of the protocol memory module PSM and the check recognition module PEM in the keystream forming module SSBM, the recognition as such and the resultant consequence for the keystream formation occurring in the check recognition module PEM.

In this regard, in the case of an erroneous use, either the keystream SSTvs is not output or an error message FM is output instead. By contrast, if there was an error-free use, then the keystream SSTvs for the encryption of the data DT, NDT is output. The same consequence with respect to the keystream formation also applies to the comparison—defined in the paragraph before the preceding paragraph—between the further initialization vector IV and the stored counter reading with regard to the initialization vector-counter reading condition $i_3 \geq i_2 = i_1+n$ to be met. That is to say that if the condition is met, the keystream $SST_{VS}$ for the data encryption is output or, if the condition is not met, the error message FM is output.

With the error message FM an error state of the keystream generator SSG in the "encryption" operating mode is advantageously indicated. Alternatively or additionally, the error state can also be set, e.g. in the form of an error bit at the output or as an output.

Furthermore, it is possible that with the error message FM in the "encryption" operating mode an invalid keystream $SST_{VS}'$ is output. In an embodiment, invalid keystream $SST_{VS}'$ is generated either from a randomly chosen block cipher key BCS or from a modified block cipher key BCS' derived from the block cipher key BCS by an arbitrary function.

In the case of the error-free use, in addition to the output keystream SSTvs for the encryption of the data DT, NDT, a check code $PRC_{GH}$ is also generated, which, for the "encryption" operating mode, is linked to a generator-specific secret GH, for example generated in the keystream generator. The secret is either generated in the secret module GHM of the keystream forming module SSBM in the keystream generator SSG or is introduced into the keystream generator from outside and then stored in the secret module. In an embodiment, since the secret has to be identical in both secret modules (for the "encryption" operating mode/for the "decryption" operating mode) for some embodiments, e.g. in the case of a symmetrical "message authentication code <MAC>", it is introduced from outside and then stored in the secret module GHM.

The secret is required in the "encryption" operating mode in order to generate the check code. A description will then be given further below in the "decryption" operating mode as to how the secret GH is used to validate the generated check code $PRC_{GH}$. The secret can be generated from the block cipher key BCS e.g. by way of a derivation function. In the simplest case, however, the secret is chosen to be identical to the block cipher key BCS.

The check code $PRC_{GH}$ can be used e.g. to protect the initialization-vector-based counter value. In addition, in an embodiment, the check code for authenticating the initialization vector is embodied in the form of an asymmetrical signature or as a symmetrical "message authentication code <MAC>".

In order to increase security, in particular visa vis replay attacks, besides the initialization vector further auxiliary data, e.g. generation counters and/or a nonce, a digital fingerprint from the block cipher key, can influence the check code or the "message authentication code <MAC>" or the asymmetrical signature.

It is if and only if the outputting of the keystream $SST_{VS}$ used to encrypt the data DT, NDT to form the ciphertext CHF occurs in the "encryption" operating mode that the check code $PRC_{GH}$ is generated, which, in the "decryption" operating mode, is crucial for the generation of the keystream $SST_{ES}$ for decrypting the data DT, NDT in the ciphertext CHF.

For this decryption of the data DT, NDT in the ciphertext CHF, in the keystream generator SSG of the keystream generator arrangement illustrated in FIG. 1 that is in the "decryption" operating mode, the keystream $SST_{ES}$ is generated on the basis of the second control data set SDS2. In accordance with the illustration in FIG. 1, the second control data set SDS2 is transferred from the keystream generator SSG in the "encryption" operating mode to the keystream generator SSG in the "decryption" operating mode. Alternatively, however, it is also possible for the second control data set SDS2 to be given or to be present automatically. The second control data set SDS2 is represented by the check code $PRC_{GH}$ generated by the keystream generator SSG in the "encryption" operating mode. In this case, the check code $PRC_{GH}$ also includes the initialization vectors IV, where IV=$i_1$, IV=$i_3$, . . . , given in the "encryption" operating mode upon the callings $i_1$, $i_3$, . . . of the keystream generator SSG that are effected with respect to the first control data set SDS1. The keystream formation of the keystream $SST_{ES}$ is once again effected for the individual operating counting cycles $i_1, i_3, \ldots$ from the encryption of the counter value given in each case in the check code $PRC_{GH}$ with the initialization vectors IV, where $IV=i_1$, $IV=i_3, \ldots$, using the block cipher key BCS.

In order that the erroneous, thus e.g. multiple or sequentially multiple, use of the block cipher key BCS and the counter values can now also be recognized in the keystream generator SSG in the "decryption" operating mode, the generated check code $PRC_{GH}$ representing the second control data set SDS2 is subjected to a validity check carried out on the basis of the secret GH, which is once again generated and stored in the secret module GHM of the keystream forming module SSBM in the keystream generator SSG. The validity check involves determining whether the generated check code $PRC_{GH}$ representing the second control data set SDS2 is valid.

This checking of whether the check code $PRC_{GH}$ is valid is effected in the "decryption" operating mode of the keystream generator SSG by way of the corresponding functional interaction and the corresponding embodiment of the secret module GHM and of the check recognition module PEM in the keystream forming module SSBM, the validity check as such and the resultant consequence for the keystream formation occurring in the check recognition module PEM.

In this regard, if the check code validity check turns out to be negative, that is to say that the check code $PRC_{GH}$ is incorrect, either the keystream $SST_{ES}$ is not output or a further error message FM' is output instead. By contrast, if the check code validity check turns out to be positive, which is tantamount to the check code $PRC_{GH}$ being correct, then the keystream $SST_{ES}$ for the decryption of the ciphertext CHF is output.

With the further error message FM' once again an error state of the keystream generator SSG in the "decryption" operating mode is advantageously indicated. Alternatively or additionally, the error state can also be set, e.g. in the form of an error bit at the output or as an output. With the further error message FM', in the "decryption" operating mode it is advantageously possible to prevent the outputting of the keystream $SST_{ES}$ for decrypting the ciphertext CHF.

In an embodiment, the functional interaction and the corresponding embodiment of the secret module GHM and of the check recognition module PEM in the keystream forming module SSBM make possible a check code validity check in such a way that in the "decryption" operating mode on the basis of the secret GH a further check code $PRC_{GH}'$ is generated and the further check code $PRC_{GH}'$ is compared with the check code $PRC_{GH}$ generated in the "encryption" operating mode in regard to correspondence. In this case, lack of correspondence means a negative validity check, while ascertained correspondence means a positive validity check.

In an embodiment, the keystream generator arrangement comprising the two keystream generators SSG as illustrated in FIG. 1, with respect to the choice of operating mode, choice of the "encryption" operating mode or choice of the "decryption" operating mode, is designed in such a way that the choice of the operating mode is configured either dynamically explicitly, e.g. by configuration PIN or configuration command, or statically by the keystream generator being defined in terms of hardware.

Additionally or alternatively, however, it is also possible to determine the choice of the "encryption" operating mode automatically by way of the first control data set SDS1 and the choice of the "decryption" operating mode automatically by way of the second control data set in the sense of a configuration.

Furthermore, it may be advantageous in both cases if the choice of the "encryption" operating mode and the choice of the "decryption" operating mode of the keystream generator SSG are irreversible, once having been made.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for operating keystream generators for secure data transmission, the keystream generators being operated in counter mode, wherein for the transmission of data, the data are encrypted to form a ciphertext using a keystream generated by a keystream generator on the basis of a first control data set, and the data in the ciphertext are decrypted using a keystream generated by the keystream generator on the basis of a second control data set, wherein the keystream is formed from the encryption of a counter value using a block cipher key, the counter value being determined continuously in the form of control-data-set-related calling ($i_1$, $i_3, \ldots$) of the keystream generator, initially being given by an initialization vector (IV) contained in the control data set, wherein $IV=i_1$, and lying in a delimited counter value range, wherein
  a) in an encryption operating mode
    a1) the sequential use of the counter values is logged and the logging allows recognition of whether the block cipher key has been used erroneously with the same counter value, wherein
    a11) in the case of erroneous use, an error message or no keystream is output, or
    a12) in the case of error-free use, the keystream for the encryption of the data is output and a check code is generated, which, for the encryption operating mode, is linked to a generator-specific secret, and
  b) in a decryption operating mode
    b1) the erroneous use of the block cipher key and counter values is recognized on the basis of the generated check code as the second control data set in the course of a validity check of the check code carried out on the basis of the secret, and thus whether the generated check code representing the second control data set is valid, wherein
    b11) a further error message or no keystream is output if the check code validity check turns out to be negative, that is to say that the check code is incorrect, or
    b12) the keystream for decrypting the ciphertext is output if the check code validity check turns out to be positive, that is to say that the check code is correct.

2. The method as claimed in claim 1, wherein the validity of the check code is checked in such a way that in the decryption operating mode, on the basis of the secret, a further check code is generated and the further check code is compared with the check code generated in the encryption operating mode in regard to correspondence.

3. The method as claimed in claim 1, wherein the check code is used to protect the initialization-vector-based counter value.

4. The method as claimed in claim 1, wherein the check code for authenticating the initialization vector is an asymmetrical signature or a symmetrical message authentication code.

5. The method as claimed in claim 1, wherein in the encryption operating mode
upon the first control-data-set-related calling ($i_1$) of the keystream generator, the initialization vector (IV) where IV=$i_1$ is given as the first control data set,
the keystream generation ($i_2$) following that uses up "n" counter values from the counter value range up to a counter reading $i_2=i_1+n$,
the counter reading $i_2=i_1+n$ is stored for logging purposes,
upon the subsequent second control-data-set-related calling ($i_3$) of the keystream generator, a further initialization vector where $i_3 \geq i_2 = i_1+n$ is chosen as further first control data set.

6. The method as claimed in claim 1, wherein in the encryption operating mode
upon the first control-data-set-related calling ($i_1$) of the keystream generator, the initialization vector (IV) where IV=$i_1$ is given as the first control data set,
the keystream generation ($i_2$) following that uses up "n" counter values from the counter value range up to a counter reading $i_2=i_1+n$,
the counter reading $i_2=i_1+n$ is stored for logging purposes,
upon the subsequent second control-data-set-related calling ($i_3$) of the keystream generator, a further initialization vector where IV=$i_3$ is input as further first control data set,
the further initialization vector input upon the second calling ($i_3$) of the keystream generator is compared with the stored counter reading with regard to an initialization vector-counter reading condition $i_3 \geq i_2 = i_1+n$ to be met and in this case either, if the condition is met, the keystream for the data encryption or, if the condition is not met, the error message is output.

7. The method as claimed in claim 1, wherein with the error message an error state is indicated and/or set.

8. The method as claimed in claim 1, wherein with the further error message in the decryption operating mode the outputting of the keystream for decrypting the ciphertext prevented.

9. The method as claimed in claim 1, wherein with the error message in the encryption operating mode an invalid keystream is output.

10. The method as claimed in claim 9, wherein the invalid keystream is generated from a randomly chosen block cipher key or from a modified block cipher key derived from the block cipher key by an arbitrary function.

11. The method as claimed in claim 1, wherein the initialization vector (IV) is automatically predefined by the keystream generator in the encryption operating mode or is fed to the keystream generator from outside.

12. The method as claimed in claim 1, wherein the choice of the encryption operating mode and the decryption operating mode of the keystream generator is configured either dynamically explicitly, by a configuration PIN or configuration command, or statically by the keystream generator being defined in terms of hardware.

13. The method as claimed in claim 1, wherein the choice of the encryption operating mode of the keystream generator is configured automatically by the first control data set and the choice of the decryption operating mode of the keystream generator is configured automatically by the second control data set.

14. The method as claimed in claim 12, wherein the choice of the encryption operating mode and the choice of the decryption operating mode of the keystream generator, once having been made, are irreversible.

15. A keystream generator having counter mode operation for secure data transmission, wherein the keystream generator includes a memory and at least one processor,
a) wherein for the transmission of data the data are encrypted to form a ciphertext using a keystream generated in the keystream generator on the basis of a first control data set, and the data in the ciphertext are decrypted using a keystream generated by the keystream generator on the basis of a second control data set, and
b) comprising a data set interface module, a block cipher module and a keystream forming module, which are connected to one another and form a common functional unit such that
the keystream is formed in the keystream forming module from the encryption of a counter value using a block cipher key, the counter value being determined continuously in the form of control-data-set-related calling ($i_1$, $i_3$, . . . ) of the keystream generator, initially being given by an initialization vector (IV) contained in the control data set, wherein IV=$i_1$, and lying in a delimited counter value range, wherein
c) the keystream forming module contains a log memory module, a secret module and a check recognition module, wherein
c1) in an encryption operating mode the log memory module, the secret module and the check recognition module in the keystream forming module, in the context of the functional unit formed by the keystream forming module, are embodied and interact such that
c11) the sequential use of the counter values is logged and the logging allows recognition of whether the block cipher key has been used erroneously, wherein
c111) in the case of erroneous use, an error message or no keystream is output, or
c112) in the case of error-free use, the keystream for the encryption of the data is output and a check code is generated, which, for the encryption operating mode, is linked to a generator-specific secret, and
c2) in a decryption operating mode the secret module and the check recognition module in the keystream forming module, in the context of the functional unit formed by the keystream forming module, are embodied and interact such that
c21) the erroneous use of the block cipher key and counter values is recognized on the basis of the generated check code as the second control data set in the course of a validity check of the check code carried out on the basis of the secret, and thus whether the generated check code representing the second control data set is valid, wherein
c211) a further error message or no keystream is output if the check code validity check turns out to be negative, that is to say that the check code is incorrect, or
c212) the keystream for decrypting the ciphertext is output if the check code validity check turns out to be positive, that is to say that the check code is correct.

16. A computer program product, comprising a non-transitory computer readable hardware storage device having computer readable program code stored therein, said program code executable by a processor of a computer system to implement the method according to claim 1.

\* \* \* \* \*